April 18, 1950 S. B. HASELTINE 2,504,263
LOCKING MEANS FOR THROWOUT CRANK ARMS OF SLIDING DOORS
Filed March 19, 1948 4 Sheets-Sheet 1

Inventor:
Stacy B. Haseltine.
By Henry Fuchs.
Atty.

April 18, 1950 S. B. HASELTINE 2,504,263
LOCKING MEANS FOR THROWOUT CRANK ARMS OF SLIDING DOORS
Filed March 19, 1948 4 Sheets-Sheet 2
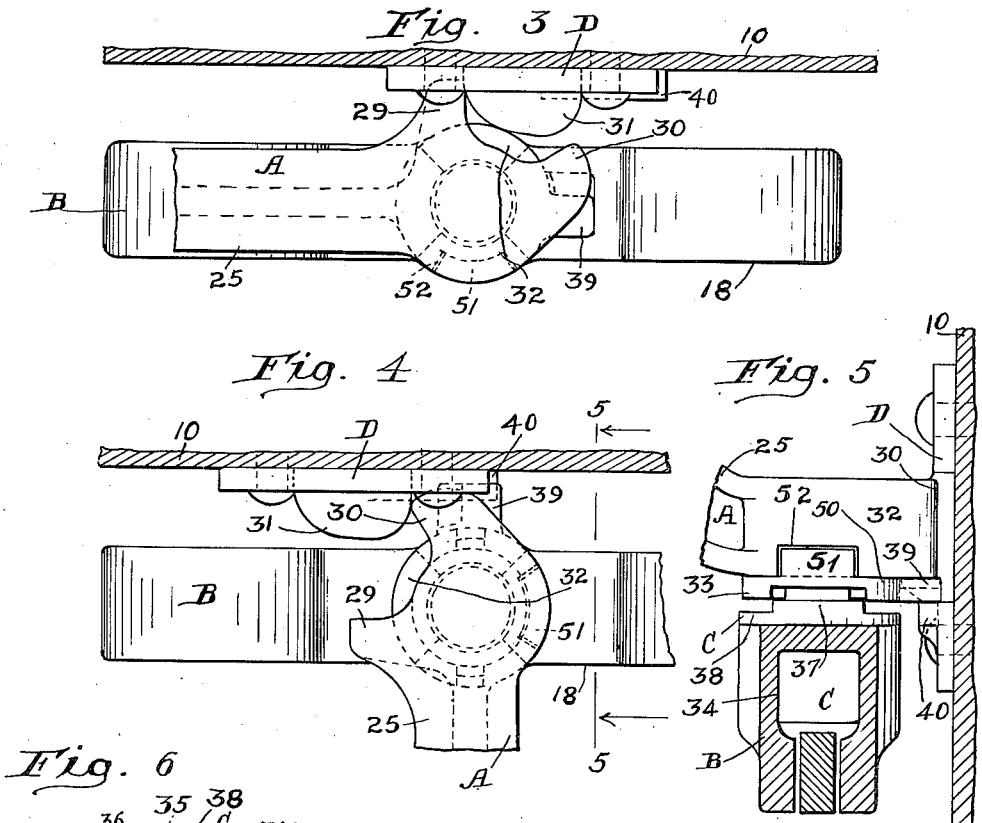
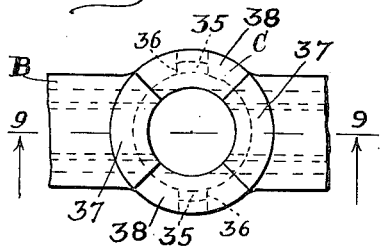
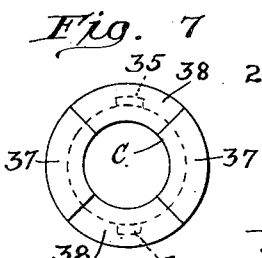
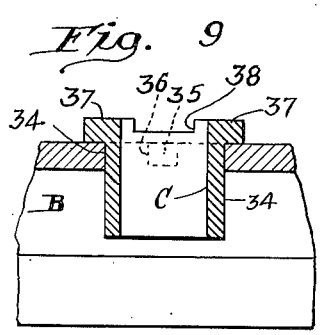
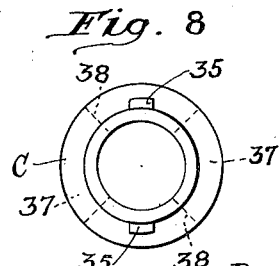
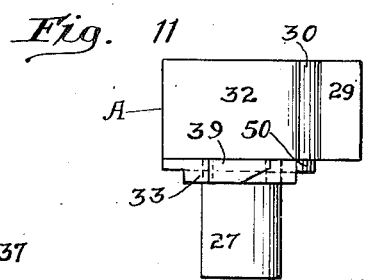
Inventor:
Stacy B. Haseltine.
By Henry Fuchs. Atty April 18, 1950     S. B. HASELTINE     2,504,263
LOCKING MEANS FOR THROWOUT CRANK ARMS OF SLIDING DOORS
Filed March 19, 1948     4 Sheets-Sheet 3

Inventor:
Stacy B. Haseltine.
By Henry Fuchs
Atty.

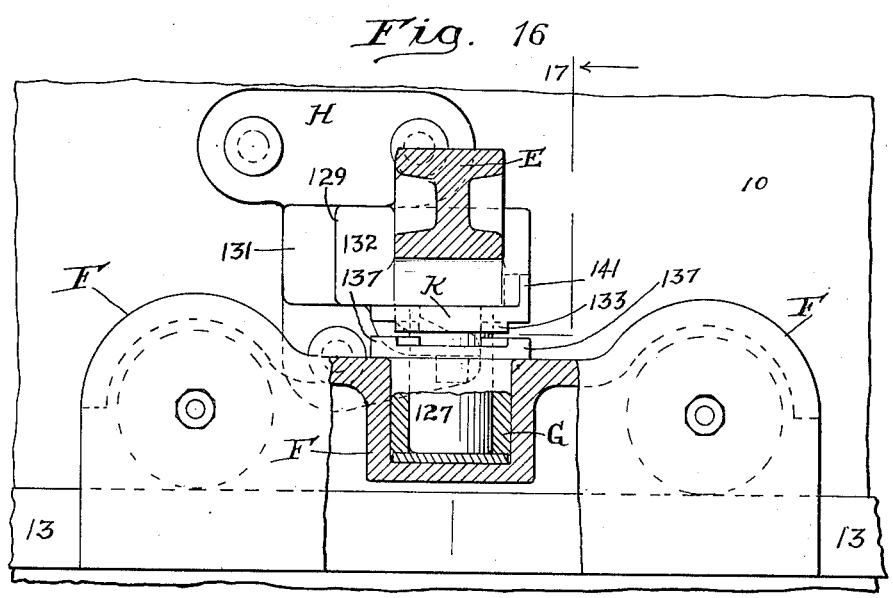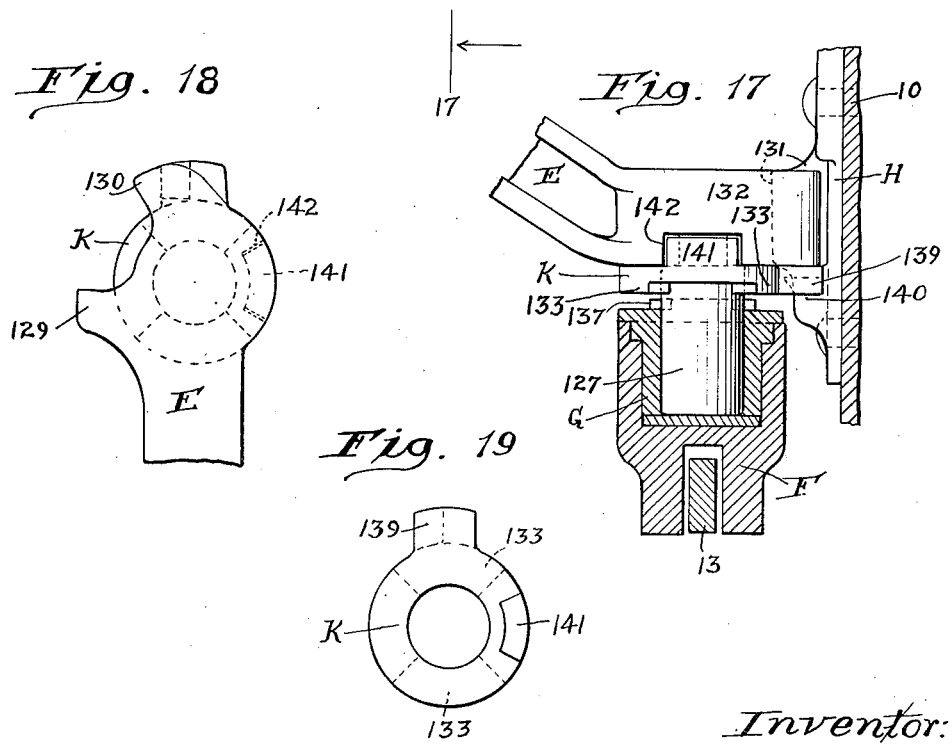

Patented Apr. 18, 1950

2,504,263

UNITED STATES PATENT OFFICE 2,504,263

LOCKING MEANS FOR THROWOUT CRANK ARMS OF SLIDING DOORS

Stacy B. Haseltine, La Grange, Ill., assignor to W. H. Miner, Inc., Chicago, Ill., a corporation of Delaware Application March 19, 1948, Serial No. 15,816

7 Claims. (Cl. 20—23)

This invention relates to improvements in locking means for throw-out crank arms of sliding doors, and more particularly to locking means which holds the crank arms at right angles to the plane of the door while the latter is slid away from and toward the door opening.

One object of the invention is to provide an automatic locking means of the character hereinbefore set forth, wherein the locking means comprises cooperating interengaging locking elements on the door supporting crank arm and the usual sliding carriage on which the arm is supported, and wherein one of the locking elements is automatically actuated through sliding movement of the door to be engaged with and disengaged from the other element.

Other objects of the invention will more clearly appear from the description and claims hereinafter following.

Figure 1:
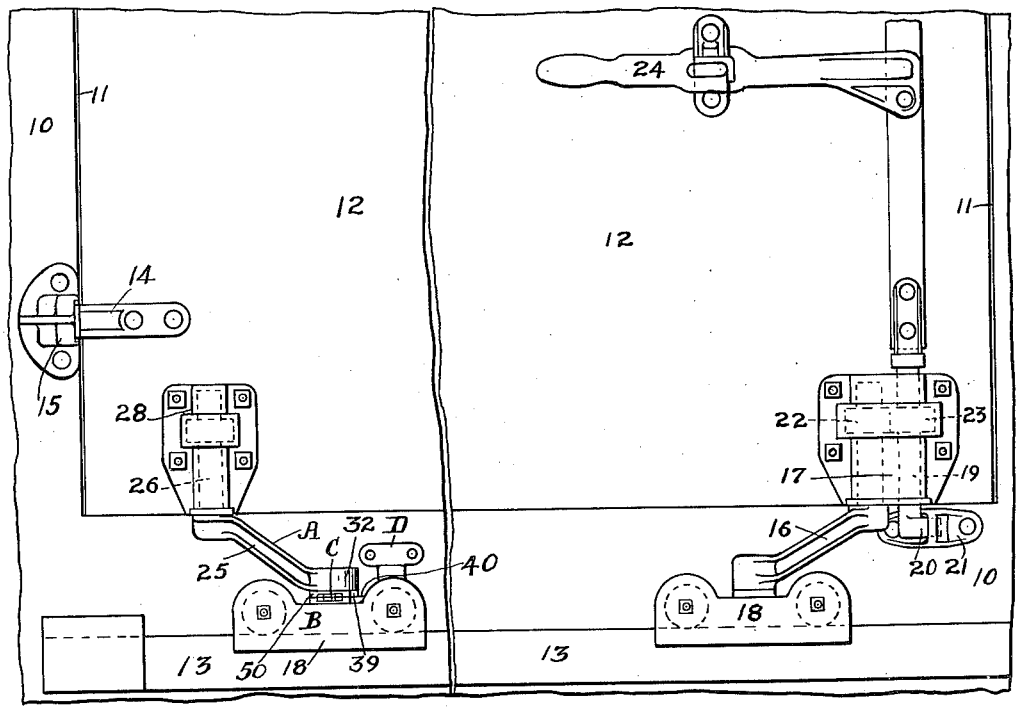
Figure 2:
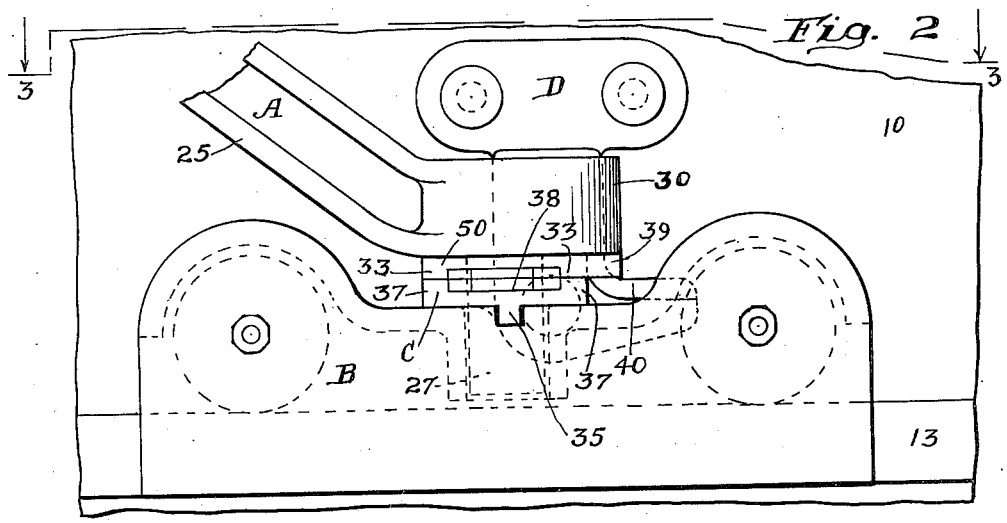
Figure 12:
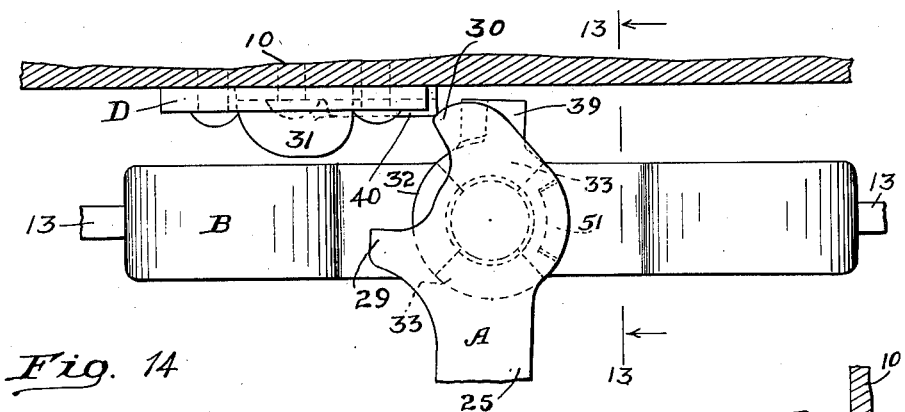
Figure 14:
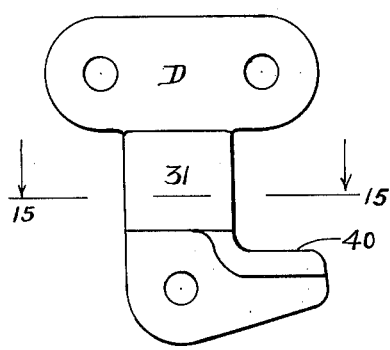
Figure 13:
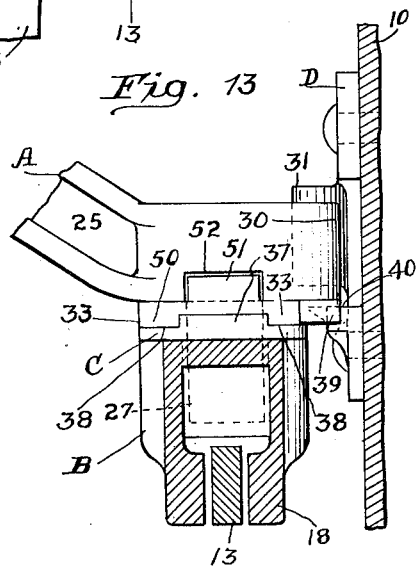
Figure 15:
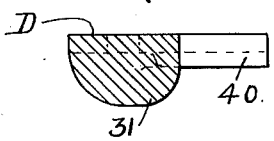

In the accompanying drawings forming a part of this specification, Figure 1 is a broken side elevational view of the lower portion of the side wall of a railway car, provided with a door opening, closed by a sliding door, illustrating my improvements in connection therewith. Figure 2 is an elevational view, on an enlarged scale, of the structure and mechanism below the lower left hand end portion of the door shown in Figure 1. Figure 3 is a horizontal sectional view, corresponding substantially to the line 3—3 of Figure 2. Figure 4 is a view, similar to Figure 3, showing the parts in different positions. Figure 5 is a vertical sectional view, corresponding substantially to the line 5—5 of Figure 4. Figure 6 is a broken top plan view of a portion of the sliding carrier shown in Figure 2, and the bearing sleeve for the door supporting crank arm. Figure 7 is a top plan view of the bearing sleeve shown in Figure 6. Figure 8 is a bottom plan view of Figure 7, looking upwardly in said figure. Figure 9 is a vertical sectional view, corresponding substantially to the line 9—9 of Figure 6. Figure 10 is a broken plan view of the end of the door supporting crank member, which end is journaled on the sliding carrier, and of a ring-shaped clutch member which is fixed thereto. Figure 11 is a side elevational view of Figure 10, looking from right to left in said figure. Figure 12 is a view similar to Figure 4, showing the carrier slid to a position to the right of that shown in Figure 4. Figure 13 is a vertical sectional view, corresponding substantially to the line 13—13 of Figure 12. Figure 14 is a front elevational view of the bracket which carries the cam means for swinging the door supporting crank arm and for controlling the operation of the locking means for said arm. Figure 15 is a horizontal sectional view, corresponding substantially to the line 15—15 of Figure 14. Figure 16 is a side elevational view, similar to Figure 2, illustrating another embodiment of the invention, showing the crank arm in position at right angles to the car wall, and in vertical section, said view being broken away to show the central portion of the carrier and cooperating parts in vertical section. Figure 17 is a vertical sectional view, corresponding substantially to the line 17—17 of Figure 16, but showing the bearing pin of the door supporting crank arm in elevation. Figure 18 is a broken top plan view of the end portion of the crank arm, which is journaled on the sliding carrier. Figure 19 is a top plan view of the sliding latch element shown in Figure 17.

In said drawings, 10 indicates the side wall of a car, which is provided with a door opening 11, closed by a sliding door 12. The door 12 is slidable along the usual top and bottom tracks, the bottom track, which is indicated by 13, only being shown. At the forward or leading end, as seen in Figure 1, the door is provided with top and bottom projecting cam lugs, engageable with keepers on the car wall, for camming the front end of the door closed, only the bottom cam lug and keeper, which are indicated by 14 and 15, respectively, being shown in Figure 1 of the drawings. The rear or right hand end of the door is supported by the usual top and bottom crank members, the bottom crank member, which is indicated by 16, only being shown. The crank member 16, which is of well-known design, is swingingly supported at its inner end on the door 12 by a bearing bracket 17, and swingingly connected at its outer end to the track 13, having said outer end journaled in a carrier 18 of well-known design, which is slidable on the track. The rear end of the door is movable inwardly and outwardly of the door opening, being provided with manually actuated operating means for positively swinging the usual upper and lower crank arms, which are at the rear end of the door. This operating means is well known in this art and includes a rotary operating bar 19, journaled in the bearing bracket 17, and having keeper engaging cam members at its ends, which are engageable with fixed keepers to force the rear end of the door tightly closed or pry the same open, only the lower keeper engaging member and keeper, which are indicated by 20 and 21, respectively, being shown in the drawings. This operating means further includes interrupted gears 22 and 23, indicated in dotted lines in Figure 1, on the bar 19 and crank member 16, respectively, to produce swinging movement of the crank member through an angle of approximately 90 degrees during rotation of the operating bar through an angle of 180 degrees. The bar 19 is rotated by the usual handle lever 24, which is pivotally connected to the same so that it may be dropped to pendant position when the door has been moved laterally out of the door opening.

As is common practice, the leading end of the door is provided with upper and lower supporting crank members journaled at their inner ends on the door and slidable along the top and bottom tracks at their outer ends, only the lower crank member being illustrated in the drawings.

In carrying out my improvements as shown in the embodiment of the invention illustrated in Figures 1 to 15 inclusive, I provide broadly a lower supporting crank member A at the front or leading end of the door, which crank member is vertically aligned with the corresponding upper crank member, not shown, a carrier B slidable on the track 13, a combined bearing and locking sleeve C on the carrier, adapted to cooperate with the crank member A, and a fixed cam bracket D having cam means thereon cooperating with the crank member to provide in and out movement of the latter and lift the same out of locking engagement with respect to the sleeve C.

The door supporting crank member A comprises an arm 25, a cylindrical shaft portion 26 upstanding from one end of the arm, that is, the outer end, and a depending cylindrical bearing projection or crank pin 27 at the other or inner end. The cylindrical shaft portion 26 is journaled for swinging movement in a bearing bracket 28 of the usual design, secured to the bottom portion of the door 12. The crank pin 27 is journaled for swinging movement in the combined bearing and locking sleeve C, which is fixedly mounted in the carrier B, as hereinafter described. The carrier B is of the usual design, except as hereinafter pointed out. The crank member A is positively swung outwardly and inwardly in the usual manner when the door is slid open and closed, by engagement with cooperating means on the wall of the container or car, the arm 25 being provided with spaced projecting fingers 29 and 30 at its inner end, which engage with a protruding cam lug 31 on the bracket D, which is fixed to the wall 10 below the door opening near the left hand end of the same, as seen in Figures 1 and 2. The inner end of the arm 25, that is, the end which is provided with the crank pin 27, is enlarged, as shown, said enlarged portion being in the form of a head 32 on which the fingers 29 and 30 are formed. At the headed end 32, the crank arm 25 carries a clutch member 50 in the form of a ring surrounding the upper end of the crank pin and locked against rotation with respect to said pin, having an upstanding keylike lug 51 engaged in a key seat 52 in the head 32 of the crank arm. The ringlike clutch member 50 has depending lugs or flat clutch projections 33—33, which extend radially and ride on the bearing or locking sleeve C, which is seated in a vertical bore 34 in the carrier B. The sleeve C is locked against rotation with respect to the carrier by projecting lugs 35—35 at opposite sides thereof, engaged in upwardly opening seats 36—36 in the carrier at diametrically opposite sides of the bore 34. At the upper end, the sleeve C has a pair of lugs or flat clutch projections 37—37, which rest on top of the carrier and are adapted to cooperate with the projections 33—33 on the clutch ring member 50 of the head 32 of the crank member A, the lugs or projections 33—33 being arranged to register with the openings 38—38 between the clutch projections 37—37 when the arm 25 of the crank member A is swung to a position at right angles to the door and car wall, as shown in Figure 5, and seat in said openings when the crank member is lowered, as shown in Figure 13. The clutch member 50 is further provided with a radially outwardly projecting cam lug 39 at one side, adapted to ride on a lengthwise extending, horizontally disposed, relatively short cam track 40 on the bracket D below the lug 31. The track 40 is in the path of movement of the cam lug 39 of the crank member A, which lug has its lower face inclined upwardly at the leading end thereof to ride up on the track to raise the clutch member 50 and the crank member A to which it is fixed, as shown in Figure 5, and thereby disengage the clutch projections 33—33 thereof from between the clutch projections 37—37 of the sleeve C as the door travels toward its closed position.

The operation of my improved holding means is as follows: Assuming that the door 12 is closed, the attendant follows the usual procedure in forcing the door out of the door opening by rotating the bar 19 by means of the operating handle lever 24, and then manually sliding the door along the track 13 away from the door opening. During the first stage of this operation, as the bar 19 is being rotated and the rear end of the door is being forced outwardly by the cam members of the bar and swinging movement of the crank members, sliding movement of the door to the right, as seen in Figure 1, is initiated. This movement of the door to the right is continued during the second stage of the operation, that is, the operation of manually sliding the door open. As the door is thus travelling toward its open position, the finger 29 of the crank member A comes into engagement with the fixed cam lug 31 and rides over said lug, thus effecting forcible swinging movement of the arm 25 of the crank member A from the dead center position shown in Figures 1, 2, and 3 toward the right angular position shown in Figures 4, 5, and 13. This swinging movement of the crank arm 25 to position at right angles to the car wall brings the door into parallelism with said wall. During this swinging movement of the crank member A, the depending lugs 33—33 of the crank arm ride on the lugs 37—37 of the sleeve C of the carrier. As the crank member A swings to the position shown in Figure 4, the cam lug 39 is engaged over the cam track 40 to support the crank member when the lugs or clutch projections 33—33 come into registration with the openings 38—38 between the lugs or clutch projections 37—37. As the door is slid further to the right, that is, to the position shown in Figure 12, the cam lug 39 rides off of the track 40, thereby permitting the crank member A to drop and bring the clutch projections 33—33 thereof into locking engagement with the clutch projections 37—37, as shown in Figure 13, thereby positively latching the crank member in its right angular position, as illustrated in Figure 12.

In closing the door, the usual procedure of manually sliding the same to partly closed position and then forcing it tightly shut, by operation of the rotary bar 19, is followed. As the door is travelling toward the closed position shown in Figure 1, the lug 39 of the crank member A rides up on the track 40, as shown in Figures 4 and 5, thereby unlatching the crank member from the carrier B and freeing the former for swinging movement. After the parts have been thus unlocked and during further travel of the door toward its closed position, the finger 30 of the arm 25 comes into engagement with the lug 31, thereby positively effecting swinging movement of the arm 25 toward the position shown in Figures 1, 2, and 3, and forcing the front end of the door into the door opening. During the first part of the rotary swinging movement of the crank member A in forcing the door closed, the crank member is held elevated by the lug 39 thereof being supported on the track 40. As the crank member starts to rotate, the clutch projections 33—33 thereof ride over the projections 37—37 of the carrier B to support the crank member after the lug 39 passed off of the track 40, due to swinging movement of the crank arm 25.

Referring next to the embodiment of the invention illustrated in Figures 16, 17, 18, and 19, the construction and design is similar to that hereinbefore described, with the exception that the locking or clutch portion carried by the crank member is in the form of a separate vertically slidable clutch element.

As shown in Figures 16, 17, 18, and 19, the crank member, which is indicated by E and corresponds to the crank member A hereinbefore described, has a head 132 at its inner end, provided with a depending crank pin 127, journaled in a bearing sleeve G, which is identical with the sleeve C hereinbefore described, and has radially extending clutch projections 137—137 at its upper end. The sleeve G is locked to the carrier, which is indicated by F, in the same manner as the sleeve C. Slidingly mounted for vertical displacement on the crank pin 127, is a ringlike clutch disc K, having depending clutch projections 133—133 engageable between the projections 137—137 of the sleeve G. To lock the clutch disc K against rotation with respect to the crank member E, an upstanding projecting keylike lug 141 is provided at the top of said disc, which lug is slidingly engaged in a vertical guideway 142 in the head 132 of the crank member.

The disc K has a radially projecting cam lug 139, which is arranged to ride on the cam track 140 of the bracket H, which bracket is similar to the bracket D hereinbefore described. The crank member E is also provided with fingers 129 and 130, similar to the fingers 29 and 30, and cooperating with a cam lug 131 on the bracket H for swinging the crank arm.

The operation of the mechanism shown in Figures 16, 17, 18, and 19 is the same as that of the mechanism hereinbefore described, with the exception that instead of lifting and dropping the crank member through the medium of the clutch disc to lock and unlock the former, the clutch disc K is lifted and lowered with respect to the crank member to produce the same results.

I claim:

1. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable in reverse directions to move the door laterally into and out of the door opening; fixed clutch projections on said carrier; cooperating clutch means carried by said crank member, including clutch projections engageable with said clutch projections of the carrier to lock said crank member to said carrier in position at right angles to said wall; and cam means for disengaging said clutch projections of the crank member from the projections of the carrier through sliding movement of the door, said cam means including a fixed cam track on said wall and a cooperating cam lug on said clutch means of the crank member.

2. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable in reverse directions to move the door laterally into and out of the door opening; fixed clutch projections on said carrier, said clutch projections being radial to the axis of rotation of said crank member on said carrier; cooperating clutch means carried by said crank member, including clutch projections radial to said axis of rotation engageable with said clutch projections of the carrier to lock said crank member to said carrier in position at right angles to said wall; and cam means for disengaging said clutch projections of the crank member from the clutch projections of the carrier through sliding movement of the door, said cam means including a fixed cam track on said wall and a cooperating cam lug on said clutch means of the crank member.

3. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable in reverse directions to move the door laterally into and out of the door opening; fixed clutch projections on said carrier; clutch projections on said crank member engageable with said clutch projections of the carrier to lock said crank member to said carrier in position at right angles to said wall; a fixed cam track on said wall; and a cam lug on said crank member adapted to ride on said cam track as the door is slid toward closed position to lift said crank member and disengage the clutch projections thereof from the clutch projections of the carrier and free the crank member for rotation.

4. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable in reverse directions to move the door laterally into and out of the door opening; fixed clutch projections on said carrier; a vertically slidable clutch element on said crank member having clutch projections thereon engageable with the clutch projections of the carrier to lock said crank member in position at right angles to said wall; means of tongue and groove formation on said crank member and element for locking said clutch element against rotation with respect to the crank member; a fixed cam track on said wall; and a radially projecting cam lug on said element adapted to ride on said track as the door is slid toward closed position to lift said element and disengage the clutch projection thereof from the clutch projections of the carrier, thereby freeing the crank member for rotation.

5. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable on said carrier in reverse directions; cooperating cam means on said crank member and wall for swinging the crank member in reverse directions to move said door laterally into and out of the door opening as the door is slid along said wall; fixed clutch projections on said carrier; cooperating clutch means carried by said crank member, including clutch projections adapted to ride on said clutch projections of the carrier as the crank member is swung inwardly and outwardly and adapted to engage between said clutch projections of the carrier when said crank member is positioned at right angles to said wall; and cam means for disengaging said clutch projections of the crank member from between said clutch projections of the carrier through sliding movement of the door and holding the same so disengaged until they override the projections of said carrier, including a fixed cam track on said wall and a cooperating lug on said clutch means of the crank member.

6. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable on said carrier in reverse directions; cooperating cam means on said crank member and wall for swinging the crank member in reverse directions to move said door laterally into and out of the door opening as the door is slid along said wall; fixed clutch projections on said carrier; clutch projections on said crank member adapted to ride on said clutch projections of the carrier as the crank member is swung inwardly and outwardly and adapted to engage between said clutch projections of the carrier when said crank member is in a position at right angles to said wall; a fixed cam track on said wall; and a cam lug on said crank member adapted to ride on said cam track for lifting the crank member to disengage said clutch projections of the same from between the clutch projections of said carrier through sliding movement of the door, and holding the same so disengaged until they override the projections of said carrier to free said crank member for rotation.

7. In a door construction for a container having a wall provided with a door opening, the combination with a sliding door for closing said opening; of guide means on said container wall extending lengthwise of the same; a carrier slidable lengthwise on said guide means; a crank member supporting said door on the carrier, said crank member being swingable on said carrier in reverse directions; cooperating cam means on said crank member and wall for swinging the crank member in reverse directions to move said door laterally into and out of the door opening as the door is slid along said wall; fixed clutch projections on said carrier; a vertically slidable clutch element on said crank member having clutch projections thereon adapted to ride on said clutch projections of the carrier as the crank member is swung inwardly and outwardly, and adapted to engage between said clutch projections of the carrier when said crank member is in position at right angles to said wall to lock said crank member in said right angular position; interengaging means of tongue and groove formation on said crank member and element for locking said element against rotation with respect to the crank member; a fixed cam track on said wall; and a radially projecting cam lug on said element adapted to ride on said track as the door is slid toward closed position to lift said element and disengage the clutch projections thereof from between the clutch projections of the carrier and hold said element elevated until the clutch projections of said element ride upon the clutch projections of said carrier.

STACY B. HASELTINE.

No references cited.